Dec. 18, 1962 G. HOHWART ET AL 3,069,181
CHUCK
Filed Aug. 3, 1961 3 Sheets-Sheet 1

INVENTORS.
George Hohwart
Paul Toth.
BY
Barnes, Dickey & Pierce
ATTORNEYS.

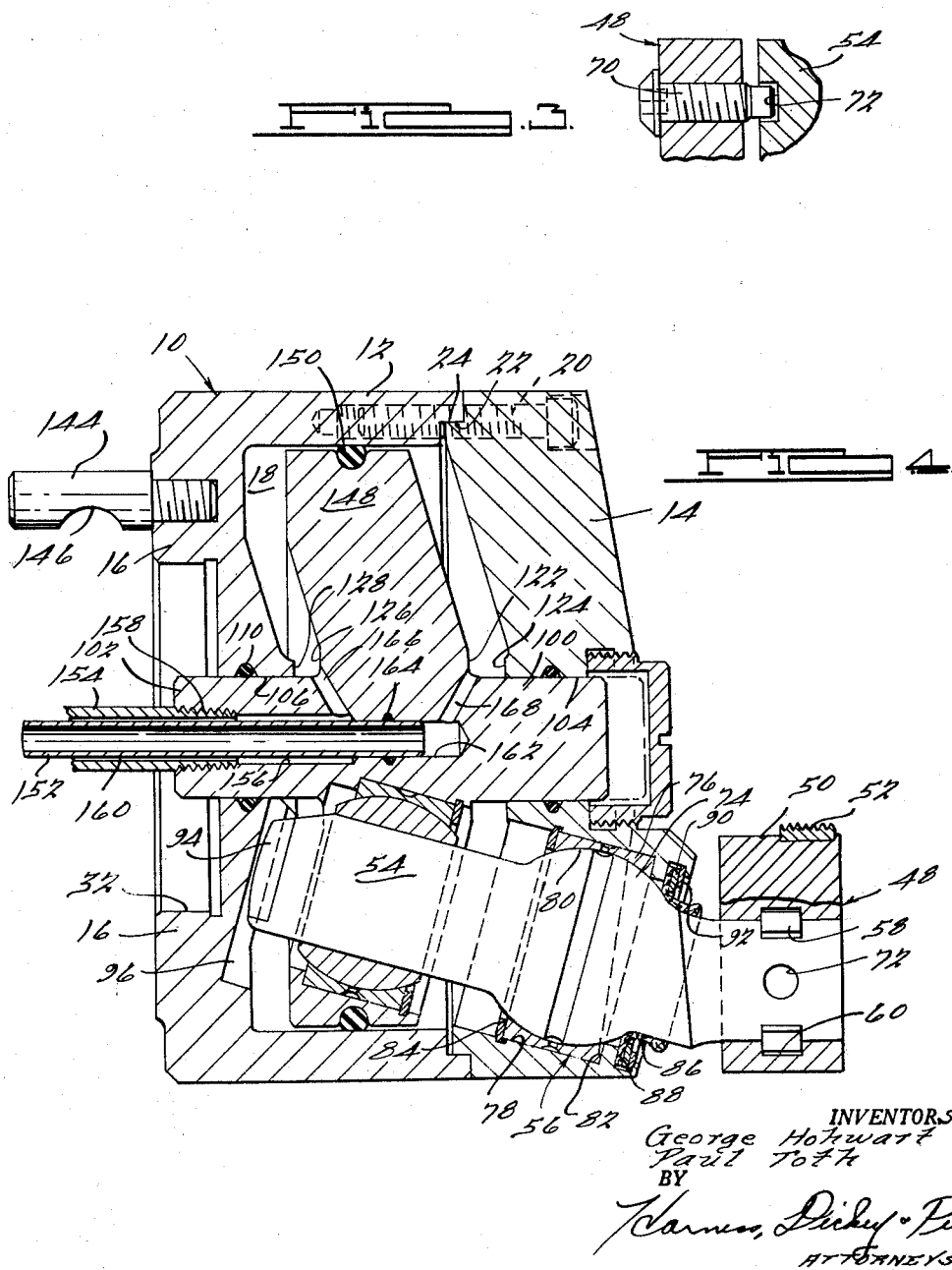

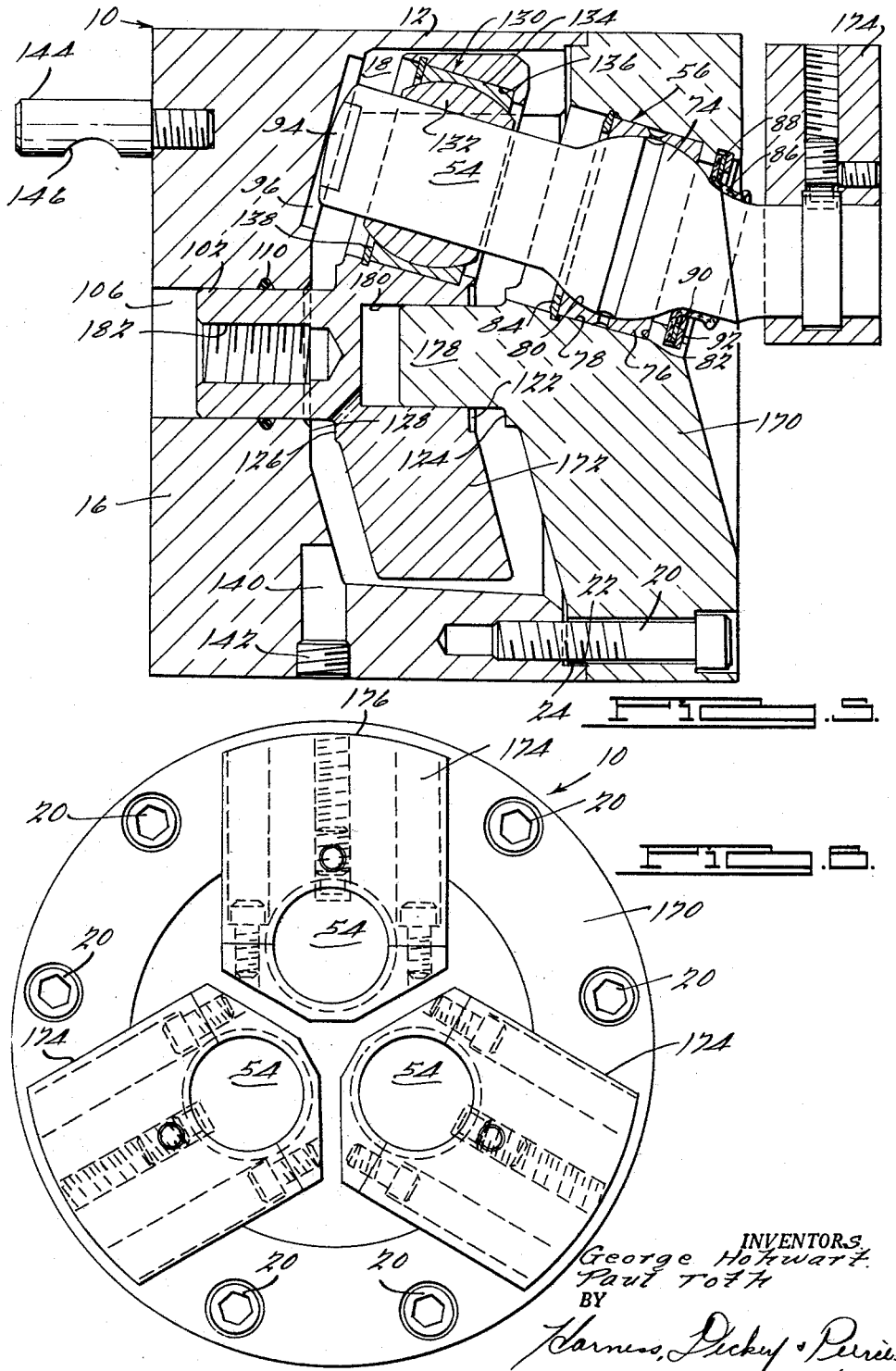

United States Patent Office 3,069,181
Patented Dec. 18, 1962

3,069,181
CHUCK
George Hohwart, Farmington Township, and Paul Toth, Allen Park, Mich., assignors to N. A. Woodworth Company, Ferndale, Mich., a corporation of Michigan
Filed Aug. 3, 1961, Ser. No. 129,029
9 Claims. (Cl. 279—106)

This invention relates broadly to new and useful improvements in work-holding chucks, and more particularly to a chuck of the type shown in our copending application Serial No. 33,543, now Patent No. 2,996,053, filed June 2, 1960.

Basically, the chuck shown in our prior application comprises a fully enclosed housing which supports a plurality of work-holding jaws operated simultaneously through toggle links by a reciprocable actuator in the housing. It has the advantage of being fully enclosed so that all of the working parts are protected from metal dust, dirt and other foreign matter occurring in use. Also, it is unique in that the jaws swing in an arc to clamp the work and in such a way that the latter is pulled back solidly against stops provided on the chuck to locate and hold the work accurately axially on the chuck. This prior chuck is commercially successful and tremendous holding pressure is developed through the toggle links which actuate the jaws. However, the necessity of using the toggle links and their mere presence in the housing requires that the chuck be of considerable diameter and this is a disadvantage in some situations.

An important object of the present invention is to provide a chuck of the general type described in our parent application but wherein the chuck jaws are actuated by a basically different mechanical means which permits the size of the chuck to be considerably reduced without sacrificing to any appreciable or significant extent the advantages inherent in this form of chuck.

Another object of the present invention is to provide a chuck of the above-mentioned type wherein the novel jaw-actuating means has a more uniform power ratio.

Still another object of the invention is to provide a chuck of the above-mentioned character that is more compact and has fewer loose parts than the parent chuck.

Yet another object of the invention is to provide a chuck of the above-mentioned character that can be easily adapted to include a self-contained, air-operated power cylinder for actuating the work-clamping jaws.

Other objects and advantages of the invention will be apparent during the course of the following description.

In the drawings, forming a part of this specification and wherein like numerals are employed to designate like parts throughout the same, FIGURE 1 is a longitudinal sectional view showing an external chuck embodying the invention and adapted for draw-bar operation;

FIG. 3 is a fragmentary, vertical sectional view taken on the line 3—3 of FIG. 2;

FIG. 4 is a vertical sectional view showing a modified external chuck having a built-in power cylinder and adapted for either hydraulic or pneumatic operation;

FIG. 5 is a vertical sectional view showing a drawbar-operated chuck of the type illustrated in FIG. 1 but modified to grip a workpiece internally; and FIG. 6 is a front elevational view of the chuck shown in FIG. 5.

Figure 1:
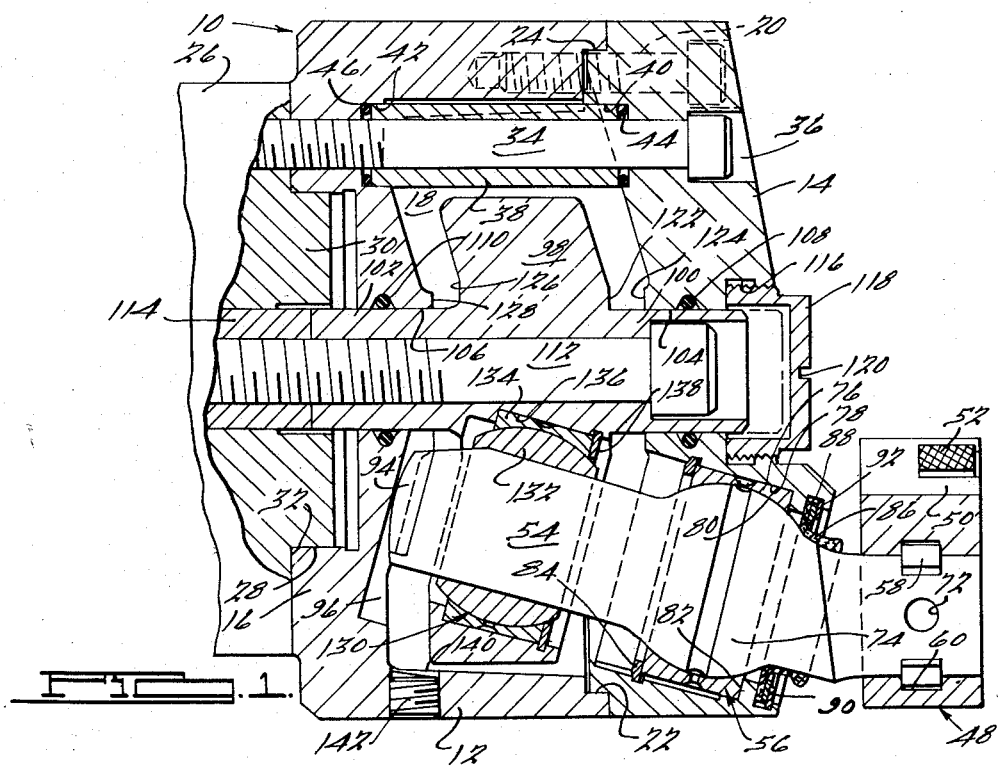
Figure 2:
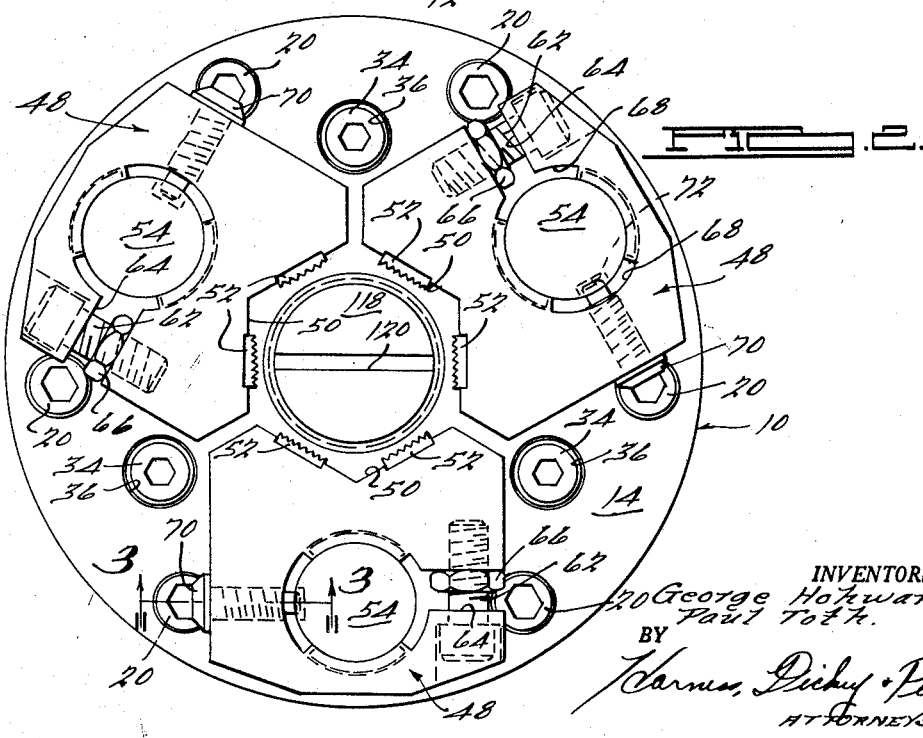
FIG. 2 is a front elevational view thereof.

Referring now to the form of the invention shown in FIGS. 1–3, it will be observed that the chuck includes a hollow body 10 having an annular side wall 12 and front and rear end walls 14 and 16 all defining and enclosing an internal chamber 18. The rear wall 16 is formed integrally or in one piece with the side wall 12. The front wall 14 is formed separately from the side wall 12 and is detachably fastened thereto by screws 20. In order to make the chamber 18 fluid-tight, the forward edge of the wall 12 is recessed as at 22 and the front wall 14 is formed with a corresponding peripheral recess 24 which interfits snugly with the recess 22 as shown in the drawing. The annular surfaces of recesses 22 and 24 preferably fit snugly together and the bottom of the recess 24 is pulled down tightly against the edge of the wall 12 by screws 22. Manifestly, however, a conventional seal such as an O-ring or the like (not shown) can be provided between the annular wall 12 and front wall 14 if necessary or desirable to assure a fluid-tight joint therebetween.

The chuck is adapted for mounting on and for rotation with the spindle 26 of the machine tool, and to that end the spindle 26 here shown is formed with an outer annular recess 28 defining a central embossment 30 and the rear end wall 16 of the housing 10 is provided with a central recess 32 which receives and snugly fits the embossment 30. Screws 34 extending entirely through the chuck body 10 from front to rear thereof project into suitably located internally threaded holes provided in the spindle 26. As shown, the heads of the screws 34 are received in sockets 36 provided in the front end wall 14, and, when the screws are tightened, they draw the rear face of the housing 10 solidly against the bottom of recess 28. In the form of the invention shown, the screws 34 extend through the outer marginal portion of the chamber 18 and, in order to prevent fluid in the housing 10 from leaking past the screws 34, sleeves 38 are provided around the screws in the chamber 18. The ends of the sleeves 38 preferably are snugly received in recesses 40 and 42 in the end walls 14 and 16 and O-rings 44 and 46 in the bottoms of the recesses are compressed to seal the screw holes by the ends of the sleeves when the mounting screws 34 are tightened.

The spindle 26 here shown is a horizontal one and the chuck accordingly rotates about a horizontal axis. However, some types of machine tools with which the chuck of this invention is adapted to be used have vertical spindles, and it is contemplated that the chuck be adapted for mounting on these spindles also. In this connection it will be readily appreciated that spindles adapted to receive chucks of the type here under consideration, differ in their construction and in the mode of attachment contemplated for the chuck, and it is within the purview and scope of this invention to adapt the housing 10 to accommodate any known form of spindle or chuck connection. Further, if desired, the instant chuck can be adapted for mounting on an indexible pallet or a stationary support. This might be necessary in certain situations as, for example, in the case of machines where the work is stationary and the tools move relative to the work.

Disposed concentrically around the rotational axis of the chuck body and in front of the forward wall 14 are a plurality of work-clamping jaws 48. Three such jaws 48 are here shown (FIG. 2), but it will be readily understood that any desired number of jaws can be provided. In the form of the invention shown, each of the jaws 48 is in the form of a split metal block having a V-shaped recess 50 at the inner side thereof for receiving and clamping a workpiece (not shown). Serrated jaw inserts 52 are provided in the recesses 50 for gripping the work. As shown in FIG. 1, each jaw 48 is mounted on a rocker arm 54 which extends through and is supported by a swivel mounting 56 fixed in the front wall 14. The jaws 48 are formed separately from the rocker arms 54 and are fastened thereto in any suitable or conventional manner. Preferably, however, the jaws 48 are mounted on the rocker arms 54 by means described in detail in our copending application Serial No. 33,542.

Specifically, the jaw mountings comprise segmental keys 58 on the rocker arms 54 fitting in annular grooves 60 provided in the jaws 48. Clamping screws 62 bridging the split openings 64 of the jaws 48 hold the latter clamped securely on the rocker arms 54. Lock nuts 66 on the clamping screws 62 within the slots 64 prevent the screws from loosening and inadvertently releasing the jaws in use. As perhaps best shown in FIGURE 2, two segmental keys 58 are provided at diametrically opposite sides of each rocker arm 54 and arranged to be bisected by a radius of the chuck body whereby to sustain reaction forces created when the jaws clamp the work. Each segmental key 58 preferably extends through an arc of slightly less than 90°, and the recesses 60 of the jaws 48 have corresponding but slightly longer segmental recesses 68 at opposite sides thereof which receive the keys when the jaws are turned sideways on the rocker arms 54.

The above arrangement provides a bayonet-type locking connection between the jaws 48 and the rocker arms 54. At assembly, the jaws 48 are slipped onto the rocker arms 54 with the jaws turned 90° from the position shown in FIGURE 2 so that the keys 58 enter the recesses 60 readily through the segmental cutouts 68. The jaws 48 are then turned 90° to the position shown in FIGURE 2 to interlockingly engage the jaws and the rocker arms 54. Clamping screws 62 are then tightened sufficiently to draw the jaws snugly against the rocker arms but not so tightly that the jaws are prevented from turning in use to accommodate or adjust to a workpiece clamped thereby.

It is of course necessary that the jaws 48 fit the rocker arms 54 sufficiently snugly so that they are prevented from wobbling or cocking on the rocker arms in the plane of the jaws when the work is clamped; however, it also is necessary that the jaws be free to turn for at least a limited distance on the rocker arms so that each jaw can adjust automatically to bring both jaw inserts 52 to bear with equal pressure on the work. To this end a screw 70 is provided in each jaw 48 opposite the slot 64. As shown in FIGURE 2, the inner end of the screw 70 is loosely received in a socket 72 provided in the rocker arm 54. Thus, the jaws 48 are free to turn on the rocker arms 54 within limits defined by the sockets 72, and interfitting engagement between the sockets and the screws 70 prevent the jaws from turning so far that the recesses 50 will not properly receive the work or sufficiently to release the rocker arms.

The chuck here shown and described is an external chuck and, except for the outer terminal portions thereof which carry the jaws 48 and which extend generally parallel to the axis of the chuck, the rocker arms 54 extend angularly inwardly from the swivel mountings 56. Thus, the outer or forward terminal portions of the rocker arms 54 are angularly related to the main body portions thereof so that the jaws 48 extend at right angles to the rotational axis of the chuck when the working parts of the chuck are disposed substantially as shown in the drawing.

Each swivel mounting 56 comprises a spherical enlargement 74 on the main body portion of the rocker arm 54. A two-piece, split-ring 76 received within and snugly fitting a recess 78 provided at the inner side of the forward housing wall 14 provides a fixed support for the rocker arm and to this end it has a spherically curved inner surface 80 which engages and conforms to the spherical enlargement 74 to provide a universal pivotal joint between the rocker arm and the mounting. As shown, the ring 76 seats against a radial shoulder 82 at the bottom of the recess 78 and it is held securely in the recess by a tapered snap-ring 84. A tubular seal 86 of rubber or the like surrounds and tightly fits the rocker arm 54 at the outer side of the swivel mounting 56 to prevent dirt, metal dust, chips and the like from gaining access to the bearing and the interior of the housing 10. The rearward portion of the sleeve 86 is flared outwardly and overlays an outwardly facing radial shoulder 88 and the overlaying portion is clamped tightly against the shoulder by a washer 90 and snap-ring 92.

The inner ends of the rocker arms 54 are formed with radial, flat-sided guides 94 which travel in radial ways 96 provided in the rear housing wall 16. Thus, the rocker arms 54 are constrained by the interfitting guides 94 and ways 96 to a generally radial rocking movement in the housing 10. The guides 94 prevent excessive turning of the rocker arms 54 in the swivel mountings 56 and thus hold the jaws 48 positioned properly at all times to engage a workpiece in the chuck.

According to the present invention the rocker arms 54 are actuated to move the jaws 48 radially of the chuck body 10 and into and out of clamping engagement with a workpiece by a sliding, reciprocable spider or actuator 98. As shown, the actuator 98 is disposed within the chamber 18 and it has forwardly and rearwardly extending trunnions 100 and 102 journaled in aligned openings 104 and 106 provided centrally in the front and rear walls 14 and 16, respectively. O-rings 108 and 110 effectively surround and snugly fit the trunnions 100 and 102 in the openings 104 and 106 to seal the same.

A screw 112 extends axially through the actuator 98 from the front thereof and into a reciprocable drawbar 114 disposed centrally within the spindle 26 according to conventional practice. When the screw 112 is tightened it pulls the actuator tightly against the drawbar so that the actuator is reciprocally actuated in the chamber 18 by the drawbar. The forward trunnion 100 extends into a central counterbore or recess 116 formed exteriorly in the forward wall 14 and the recess is normally closed by a hollow cap 118 threaded therein. A diametrical slot or kerf 120 preferably is provided in the cap 118 to receive a suitable tool for tightening or loosening the cap. Manifestly, when the cap 118 is removed, access is readily had to the screw 112. In normal use of the chuck, the cap 118 of course keeps dirt and undesirable foreign matter away from the trunnion 100 and other operating parts of the chuck.

In operation, an annular shoulder 122 provided on the front of the actuator 98 around the trunnion 100 engages a stop 124 on the rear face of the wall 14 to limit forward motion of the actuator and a rearwardly facing annular shoulder 126 surrounding the trunnion 102 engages a stop 128 on the rear wall 16 to limit rearward or retractive movement of the actuator. Reciprocatory travel of the actuator 98 is translated into a rocking motion of the arms 54 to move the jaws 48 radially into and out of clamping engagement with a workpiece by means of sliding swivel mountings 130. The mountings 130 comprise inner rings 132 surrounding and slidable on the rocker arms 54 and outer rings 134 fastened to the actuator 98. As shown in FIGURE 1, the outer rings 134 are set into recesses 136 in the front face of the actuator 98 and they are held securely in place by snap-rings 138. The interfaces between rings 132 and 134 are spherically curved about the center of the rocker arms 54 so that the inner rings 132 are free to shift angularly, universally in the outer rings 134 as the actuator 98 moves back and forth. Also, the inner rings slide on the rocker arms 54 as the actuator 98 moves and as they slide the rocker arms 54 are moved angularly in the housing 10 to shift the jaws 48 radially in and out. This motion is of course accommodated by universal movement of the inner rings 132.

In use, the chamber 18 normally is filled approximately half full of oil which keeps the various moving parts of the chuck properly lubricated at all times. Oil is introduced into the chamber 18 through a filler hole 140 which normally is closed by a plug 142. If the chuck is used in the horizontal position as shown in the drawing, the hole 140 also is used to drain the oil when necessary from the chamber 18. On the other hand, if the chuck is intended for use in a vertical position, it may be necessary to provide a second hole (not shown) approximately half way up the side of the chamber 18 and in this event the hole 140 is used as a drain hole only.

From the foregoing, it will be readily apparent that advancement of the actuator 98 in the cylinder 18 causes the swivel mountings 130 to slide forwardly on the rocker arms 54. Since the swivel mountings 56 are fixed, forward sliding movement of the mountings 130 necessarily changes the angular position of the rocker arms 54. As the actuator 98 advances, the rearward ends of the rocker arms move radially inwardly and the outer ends thereof which carry the jaws 48 move radially outwardly. Manifestly, as the angular positions of the rocker arms 54 change, the inner rings 132 turn or roll in the outer rings 134 to compensate for the change in the angular position of the rocker arms. The end result of this operation is that the jaws 48 are spread apart or opened. In use this, of course, would cause the jaws to disengage or release a workpiece in the chuck.

Conversely, as the actuator 98 is retracted in the chamber 18, it causes the movable swivel mountings 130 to slide rearwardly on the rocker arms 54. This, in turn, causes the inner or rearward ends of the rocker arms 54 to swing radially outwardly and the forward jaw carrying ends thereof to swing radially inwardly. This movement of the jaws 48 of course is a closing movement and, in use, the jaws are moved in this manner to engage or clamp a workpiece in the chuck. As the drawbar 114 and actuator 98 are pulled rearwardly, the wedging action exerted by the swivel mountings 130 against the rocker arms 54 after the jaws 48 close on the workpiece cause the jaws to grip the work exceedingly tightly and this same wedging action causes the jaws to maintain their grip on the workpiece with great effectiveness. On the other hand, the grip of the jaws 48 on the work is easily released in a reverse manner by forward movement of the drawbar 114 and actuator 98.

As suggested, it is a feature of the invention that the outer jaw carrying portions of the rocker arms 54 be positioned substantially parallel to the axis of the chuck when the actuator 98 is in the intermediate position shown in the drawing, and the jaws 48 move inwardly from this position to clamp the work. Thus, as the jaws 48 move into clamping position they swing inwardly and rearwardly with respect to the chuck body. As a consequence, the jaws 48 exert a pull-back action on the workpiece which holds the latter solidly against the front face of the chuck body, or, alternatively, against suitable stops (not shown) provided on the chuck body. In the construction shown, the cap 118 would serve as a stop for a workpiece. This manner of clamping the workpiece positions it accurately axially in the chuck and holds it solidly and securely against the back-up stops. This is highly desirable when certain types of machining or forming operations are to be performed on the work.

Reference is now had to FIGURE 4 which shows a modified chuck embodying the invention in which the housing 10 is constructed so that the chamber 18 is in the form of a true cylinder and the actuator 98 is constructed to provide a piston 148 in the cylinder. Means are provided in place of the drawbar 114 for introducing fluid under pressure into the cylinder 18 at opposite sides of the piston 148 thereby including the power source in the chuck itself.

A detailed description of the chuck shown in FIGURE 4 is now given, but inasmuch as this chuck is basically similar to the one shown in FIG. 1 only the parts which are different are described in detail. It will be understood that parts not specifically described in detail are identical or similar for all practical purposes to corresponding parts in the first form of the invention.

Although the piston 148 can be made to accommodate the spindle fastening screws 34 and the surrounding sleeves 38 the modified chuck here under consideration preferably is fastened to the spindle 26 by some means that does not interfere with the piston. It is contemplated that any suitable or conventional form of fastening means be used, for example, the housing 10 can be fastened directly to the spindle by screws which extend through the rear wall 16 only and into the spindle. However, this requires that the housing 10 be mounted as an individual part on the spindle and the working parts of the chuck then assembled in the housing. Accordingly, the housing 10 is here shown provided with cam-lock spindle adaptors 144 of a conventional type which cooperate with a conventional cam lock spindle (not shown) to fasten the chuck to the spindle. In practice, a plurality (usually three) of the stud adaptors 144 are provided on the rear of the chuck housing. These studs 144 fit into suitably formed sockets in the end of the spindle and cam locks in the spindle are actuated to enter lateral recesses 146 in the studs to lock the studs and the chuck in place on the spindle.

As suggested, the actuator 98 employed in the first form of the invention, is replaced by a piston 148 which substantially fills the chamber 18 and is sealed peripherally thereto by a sealing ring 150. However, it will be observed that the piston 148 is formed with centrally disposed front and rear trunnions 100 and 102 in the same manner as the actuator 98 and the trunnions are similarly slidably received in the housing openings 104 and 106 to guide the piston during reciprocatory travel thereof in the cylinder 18.

Inasmuch as the piston actuator 148 is adapted for pneumatic or hydraulic operation, the need for the drawbar screw 112 also is eliminated. Instead, the piston actuator 148 is adapted for connection to the inner and outer pipes 152 and 154 with which machines adapted for hydraulic or pneumatic operation conventionally are equipped. The pipes 152 and 154 usually extend from a suitable source of fluid under pressure and a control valve at the rear of the machine and thence through a central passage in the spindle to the chuck at the forward end of the spindle. These pipes 152 and 154 usually are flexible or extensible or otherwise adapted to permit axial movement thereof in the spindle 26. In the form of the invention shown, the outer pipe 154 extends into a central passage 156 in the rear trunnion 102 and is connected thereto by screw threads 158. The inner pipe 152 is spaced circumferentially from the outer pipe 154 to provide an annular passage 160 therebetween, and the forward end thereof projects into an extension 162 of the passage 156. The extension 162 is smaller in diameter than the passage 156 to snugly receive the inner pipe 152 and the latter is sealed to the wall of the extension passage by an O-ring 164 or the like. Thus, the annular passage 160 communicates with the passage 156 but is blocked off from the extension 162 by the sealing ring 164. A lateral port 166 connects the passage 156 with the cylinder 18 behind the piston 148 and a lateral port 168 connects the passage extension 162 and the inner pipe 152 with the cylinder 18 ahead of the piston 148. The fluid control valve hereinabove referred to, with which machines of the type here under consideration conventionally are equipped, directs fluid under pressure either to the inner pipe 152 or to the annular passage 160. When one of these passages is connected to the pressure port of the valve the other is automatically exhausted or discharged to a sump to permit free movement of the piston 148.

In operation, fluid under pressure is first directed to the chuck through the outer pipe 154 and annular passage 160 and fluid pressure is permitted to build up in the cylinder 18 behind the piston 148 to advance the latter. As the piston 148 advances, it opens the jaws 48 as described in connection with the first form of the invention. Ultimate advancement of the piston 148 is limited by engagement of the shoulder 122 with the stop 124. A workpiece can be readily placed in the chuck when the jaws are fully open. Thereafter, the outer pipe 154 is connected to sump and fluid under pressure is introduced into the inner pipe 152 so that fluid under pressure builds up in the cylinder 18 ahead of the piston 148 to retract the latter. As the piston retracts, it closes the jaws 48 as described in connection with the first form of the invention. Manifestly, the piston 148 will continue to retract until the jaws 48 close firmly on the work. It is intended that the jaws 48 swing inwardly of the position shown in the drawing at the time they contact the work so that the latter is pulled back against suitable stops by the closing action of the jaws. Fluid pressure in the cylinder 18 ahead of the piston 148 continues to exert force on the piston as long as pressure is maintained in the cylinder. In normal use, the pressure is maintained to clamp the jaws the entire time the chuck is in use and while machining or other operation is performed on the work. Thereafter, the direction of fluid pressure is again reversed to advance the piston in the manner described to release the clamping jaws 48.

Attention is now directed to the form of the invention shown in FIGS. 5 and 6. The chuck there shown is substantially identical to the one first described except that certain parts thereof are modified and rearranged to provide an internal chuck. It is a special feature of the invention that the same basic jaw assembly can be used for both internal and external chucks. In the case of an external chuck, the rocker arms of the jaw assemblies are arranged to extend angularly inwardly toward the actuator; whereas, in the case of the internal chuck, the rocker arms are disposed to extend angularly outwardly toward the actuator. It is, of course, necessary also to provide a modified front wall on the chuck housing 10 which is uniquely adapted to support the differently arranged rocker arms 54 and an actuator which is modified to receive the differently positioned rocker arms. Also, in this form of the invention, the fixed swivels 56 for the rocker arms 54 are disposed relatively close together around the center of the chuck and this in turn requires a modified means for guiding the actuator. The jaws themselves, of course, are modified to engage a workpiece internally rather than externally.

Inasmuch as the internal chuck shown in FIGS. 5 and 6 is similar in many respects to the external chuck shown in FIGS. 1 and 2, corresponding parts of the two chucks are identified by the same reference numerals. Only those parts which are significantly different are described in detail and identified by separate reference numerals. It will be understood that parts not described in detail are identical or equivalent to corresponding parts in the first form of the invention both in structure and in function.

As suggested, the chuck body 10 of the internal chuck shown in FIGS. 5 and 6 has a modified front wall 170 which fits the annular side wall 12 of the body 10 and is fastened thereto in the same manner as the chuck shown in FIG. 1. In this case, however, the front wall 170 preferably is dished inwardly to accommodate the fixed swivel mountings 56 which are positioned to receive the rocker arms 54. The latter are reversed from the positions shown in FIG. 1 and incline angularly outwardly toward the actuator 172, as shown in the drawing. Also, at least the portions of the actuator 172 which carry the sliding swivel mountings 130 extend angularly outwardly and forwardly in the cylinder 18 in order to accommodate the reversed angular position of the rocker arms 54.

The jaws 174 here shown also are modified to engage and clamp the work internally. In practice, the jaws 174, of course, may vary considerably in size and shape, depending upon the nature of the work to be clamped thereby. However, the particular jaws 174 here shown are adapted to engage an internal annular surface and they therefore are provided with arcuately curved external clamping faces 176.

The actuator 172 has a rearwardly extending centrally disposed guide trunnion 102 as in the first form of the invention. However, because of the different arrangement of the jaw assemblies, it is expedient in this instance to provide the front housing wall 170 with a fixed, centrally disposed, rearwardly extending guide trunnion 178 which extends into but is snugly and slidably received by a socket 180 in the actuator 172. Manifestly, the two guide trunnions 102 and 178 mutually cooperate to guide and direct the actuator 172 in its reciprocatory travel in the cylinder 18.

The chuck housing 10 is provided with cam lock adaptors 144 similar to the ones shown on the chuck illustrated in FIG. 4 for connecting the chuck to the spindle of a machine tool. Also, it will be observed that the internal chuck of FIG. 5 is adapted for drawbar operation and that the rearwardly extending trunnion 102 has an internally threaded socket 182 for receiving a correspondingly threaded stud on the end of the drawbar (not shown).

The operation of the drawbar and the actuator 172 to open and close the jaw assemblies will be apparent from the detailed description given in connection with the first form of the invention.

What is claimed is:

1. A chuck comprising a support, a plurality of work engaging jaws arranged in annular series on said support, rocker arms carrying said jaws, fixed swivel mountings connecting said rocker arms to said support, a reciprocable actuator disposed centrally of said jaws and said rocker arms, and swivel mountings slidable on said rocker arms connecting the latter to said actuator, said last mentioned mountings being a different distance radially from said actuator than said fixed swivel mountings, whereby reciprocatory movement of said actuator and consequential sliding movement of said sliding swivel mountings on said rocker arms rocks the latter in said fixed mountings and moves said jaws radially relative to each other.

2. A chuck comprising a rotatable housing, a plurality of jaws disposed around and equidistantly from the axis of said housing adapted to hold a workpiece in said chuck, rocker arms carrying said jaws extending generally axially into said housing, swivel mountings connecting said rocker arms to said housing and permitting free pivotal movement thereof relative to the housing, an actuator in said housing mounted for sliding movement along the axis of the housing, and swivel mountings within said housing connecting said rocker arms to said actuator, said last mentioned swivel mountings being a different distance radially from the axis of the housing than said first mentioned swivel mountings and being fixed to said actuator and slidable on said rocker arms whereby sliding movement of said actuator effects a corresponding sliding movement of said second mentioned swivel mounting on said shank rocker arms to rock the latter in said first mentioned swivel mountings and to move said jaws radially relative to a workpiece in said chuck.

3. A chuck comprising a hollow rotatable housing having a radial front wall, a plurality of swivel mountings fixed in the front wall of said housing and arranged concentrically around the axis thereof, work clamping jaws in front of said housing, rocker arms carrying said jaws and extending rearwardly thereof into said housing through said swivel mountings, a reciprocable actuator, and swivel mountings slidable on said rocker arms within said housing and connected to said actuator, said sliding swivel mountings being spaced a different radial distance from the axis of the housing than said fixed swivel mountings and adapted to rock said rocker arms in said fixed mountings and to move said jaws radially with respect to each other upon reciprocatory movement of said actuator.

4. A chuck comprising the rotatable housing and a centrally disposed cylinder therein, a plurality of swivel mountings fixed in said housing at one end of said cylinder and arranged concentrically around the axis thereof, work clamping jaws, rocker arms carrying said jaws extending into said cylinder through said swivel mountings, a piston mounted for reciprocation in said cylinder, swivel mountings slidable on said rocker arms and connected to said piston, and means for supplying fluid under pressure selectively to said cylinder at opposite sides of said piston to reciprocally actuate the latter, said sliding swivel mountings being spaced a different radial distance from the axis of the housing than said fixed swivel mountings and adapted to rock said rocker arms in said fixed mountings and to move said jaws radially with respect to each other upon reciprocatory movement of said piston.

5. A chuck comprising a rotatable housing having a centrally disposed cylinder therein, a plurality of swivel mountings fixed in one end wall of said housing and of said cylinder and disposed concentrically around the axis thereof, work clamping jaws, rocker arms carrying said jaws extending into said cylinder through said swivel mountings, a piston mounted for reciprocation in said cylinder, means guiding said piston during reciprocatory travel thereof, stop means at opposite ends of the cylinder engageable with the piston to limit travel thereof in both directions, swivel mountings slidable on said rocker arms within said cylinder and connected to said piston, and means for conducting fluid under pressure selectively into the cylinder at opposite sides of the piston, said sliding swivel mountings being spaced different radial distances from the axis of the housing than said fixed swivel mountings and adapted to rock said rocker arms in said fixed mountings and to move said jaws radially with respect to each other upon reciprocatory movement of said piston.

6. A chuck comprising a rotatable support, a plurality of fixed swivel mountings carried by said support and arranged concentrically around the axis thereof, work clamping jaws on front of said support, rocker arms carrying said jaws and extending through said fixed swivel mountings, a reciprocable actuator, and movable swivel mountings connected to said actuator and slidable on said rocker arms, said sliding swivel mountings being spaced a lesser radial distance from the axis of the housing than said first mentioned swivel mountings, whereby retraction of said actuator rocks said shank portions in said fixed swivel mountings to move said jaws inwardly and into clamping engagement with a workpiece supported thereby.

7. A chuck comprising a rotatable support, a plurality of swivel mountings carried by said support and arranged concentrically around the axis thereof, work clamping jaws in front of said support, rocker arms carrying said jaws and extending through said swivel mountings, a reciprocable actuator, other swivel mountings connected to said actuator and slidable on said rocker arms, said other swivel mountings being spaced a lesser radial distance from the axis of the housing than said first mentioned swivel mountings whereby retraction of said actuator rocks said rocker arms in said first mentioned swivel mountings to move said jaws inwardly and into clamping engagement with a workpiece supported thereby, and stop means for limiting retractive movement of said actuator.

8. A chuck comprising a rotatable support, a plurality of swivel mountings carried by the support and arranged concentrically around the axis thereof, work clamping jaws in front of said support, rocker arms carrying said jaws and journaled in said swivel mountings, a reciprocable actuator, and other swivel mountings connected to said actuator and slidable on said rocker arms behind said first mentioned swivel mountings, said other swivel mountings being spaced a greater radial distance of the axis of the support than said first mentioned swivel mountings whereby retractive movement of said actuator rocks the shank portions of said jaws in said first mentioned mountings to move said jaws outwardly into clamping engagement with a workpiece supported thereby.

9. A chuck comprising a rotatable support, a plurality of swivel mountings carried by said support and arranged concentrically around the axis thereof, work clamping jaws in front of said support, rocker arms carrying said jaws and journaled in said swivel mountings, a reciprocable actuator, other swivel mountings connected to said actuator and slidable on said rocker arms behind said first mentioned swivel mountings, said other swivel mountings being spaced a greater radial distance from the axis of said support than said first mentioned swivel mountings whereby retractive movement of said actuator rocks said rocker arms in said first mentioned swivel mountings to move said jaws outwardly into clamping engagement with a workpiece supported thereby, and stop means for limiting retractive movement of said actuator.

References Cited in the file of this patent
UNITED STATES PATENTS

| | | |
|---|---|---|
| 2,494,166 | Drissner | Jan. 10, 1950 |
| 2,613,943 | Trudeau | Oct. 14, 1952 |
| 2,712,449 | Grobey | July 5, 1955 |